United States Patent [19]

Noel et al.

[11] Patent Number: 5,301,402
[45] Date of Patent: Apr. 12, 1994

[54] AUTOMATED BUTTON CLOSING MACHINE

[75] Inventors: Charles E. Noel, Hamden, Conn.; Mark H. Hamilton, Jaffrey; Timothy P. White, New Boston, both of N.H.

[73] Assignee: Waterbury Companies, Inc., Waterbury, Conn.

[21] Appl. No.: 648,810

[22] Filed: Jan. 31, 1991

[51] Int. Cl.⁵ .................................... B21F 45/28
[52] U.S. Cl. ............................ 29/4; 29/559; 29/710; 29/721; 29/743; 29/787; 29/792; 29/818; 29/DIG. 44; 79/1; 79/4; 269/21; 279/3
[58] Field of Search ............ 79/1, 4, 5; 29/4, 559, 29/710, 715, 720, 721, 822, 787, 743, DIG. 44, 335, 38 A, 785, 792, 445, 525.1, 818; 279/3; 269/21

[56] References Cited

U.S. PATENT DOCUMENTS

| | | | |
|---|---|---|---|
| 598,711 | 2/1898 | Ludington | 29/4 |
| 1,152,111 | 8/1915 | Lopez | 79/4 |
| 2,348,441 | 5/1944 | Walker | 79/1 |
| 3,442,163 | 5/1969 | Chalfin et al. | 79/5 |
| 3,548,689 | 12/1970 | Newig | 79/5 |
| 3,662,626 | 5/1972 | Alpert | 79/4 |
| 3,750,256 | 8/1973 | Elmer | 29/710 |
| 3,802,051 | 4/1974 | Andler et al. | 29/710 X |
| 3,802,052 | 4/1974 | Andler et al. | 29/710 |
| 3,815,221 | 6/1974 | Pearl | 29/559 |
| 3,858,462 | 1/1975 | Orlando et al. | 79/5 |
| 4,007,537 | 2/1977 | Silverbush et al. | 29/809 X |
| 4,221,139 | 9/1980 | Peterson | 79/1 |
| 4,532,684 | 8/1985 | Roebuck | 79/5 X |
| 4,618,410 | 10/1986 | Stokoe et al. | 29/743 |
| 4,763,391 | 8/1988 | Yoshioka et al. | 29/784 X |
| 4,850,102 | 7/1989 | Hironaka et al. | 29/822 X |
| 4,939,838 | 7/1990 | Gatta | 29/822 X |
| 5,113,572 | 5/1992 | Trocola | 29/788 X |
| 5,159,745 | 11/1992 | Kato | 29/791 |

FOREIGN PATENT DOCUMENTS

| | | | |
|---|---|---|---|
| 1213209 | 11/1970 | United Kingdom | 79/1 |
| 1222131 | 2/1971 | United Kingdom | 79/1 |

Primary Examiner—Mark Rosenbaum
Assistant Examiner—Frances Chin
Attorney, Agent, or Firm—Pennie & Edmonds

[57] ABSTRACT

A machine for automatically joining front and back parts of buttons employs a turntable with nests that are rotated through a series of stations at which the parts are placed in the nests in a desired orientation, joined, and checked for defects. Orientation of the parts is achieved by video imaging of a first part as it is randomly placed in a nest, and computer-controlled placement of the second part based on the ascertained position of the first part.

52 Claims, 9 Drawing Sheets

AUTOMATED BUTTON CLOSING MACHINE

FIELD OF THE INVENTION

The present invention relates to a method and apparatus for manufacturing buttons having an ornamental front portion and a back portion with a loop.

BACKGROUND OF THE INVENTION

The manufacture of a button requires the alignment and joining of a front and back portion. Alignment is necessary because the front of the button ordinarily has a design that is intended to be viewed at a particular orientation, and the back of the button has a loop that is to be sewn onto a piece of clothing at a particular orientation. The two pieces must be coordinated if the design on the front is to appear correct to an observer of the clothing. The joining step holds the front to the back, and maintains the two pieces at the desired relative orientation.

At present the button forming operation is carried out manually by an operator using a single press to form buttons one at a time. With one hand, the operator places a back piece into a cradle on the press. A slot in the cradle corresponding to the loop on the back piece orients successive back pieces in a constant position. A front piece is then placed on the back piece, with the design on the front aligned as desired. The operator then activates the press, usually by a foot pedal, to join the pieces together. The completed button is manually removed from the press and the process is repeated.

From the foregoing illustration, numerous shortcomings are apparent in the present mode of button manufacturing. First, the production rate of buttons processed in this fashion is subject to limitations in the operator's faculties, including physical dexterity in handling the button pieces and mental dexterity in aligning them.

Second, and relatedly, the quality control in such a manual process is subject to variations in a given operator's work, and from operator to operator. Thus, high production rates of properly formed buttons having designs consistently oriented within an acceptable margin of error is difficult if not impossible to achieve.

Third, the basic flow of the manual process requires that a button be produced to completion before the manufacture of the next button is begun.

Finally, although many safeguards are present in such press machines, the manual operation of such machines by a careless or inattentive operator can lead to injury.

It is therefore an object of the present invention to improve the production rate of buttons over that of the manual method.

It is another object of the invention to improve the alignment of the button pieces with one another.

It is a further object of the invention to improve the quality control over the button manufacturing process by constraining the range of error which occurs during production.

It is still another object of the invention to provide a streamlined production process in which buttons are simultaneously assembled in a series of steps.

It is yet another object of the invention to provide a button forming machine in which operator safety is increased compared to currently utilized devices.

SUMMARY OF THE INVENTION

These and other objects of the invention that would be apparent to one skilled in the art are provided by the apparatus of the present invention, which comprises a rotating turntable having retaining means spaced around its circumference for holding the button parts, and work stations spaced around the turntable for performing the various orienting, joining, and quality control operations.

In a preferred embodiment, the turntable has six nests located on nubs extending from its circumference. The nests are spaced so that all can simultaneously be aligned with the six corresponding work stations around the turntable.

The first work station is responsible for loading a button front part (or shell) into a nest and determining the orientation of the front piece's design as it sits in the nest. A pick and place mechanism is used to retrieve face-down front parts from a supply and place them in nests. A camera sends an image of the design on each front part to a computer as the part is held by the pick and place mechanism. This image represents the fixed orientation that the button part will have after it is placed in the nest.

The second work station places the back part (or back) into the front part with the two parts properly aligned to form a button combination. The pick and place mechanism used for the back parts at the second station is substantially similar to the mechanism at the first station, with one additional feature. In addition to horizontally and vertically transporting the button backs, the second station mechanism can provide rotational displacement to such backs for alignment within the front part at a preselected orientation.

In order to determine the rotation necessary to effect the desired alignment of the button back with the button front, a computer interface is used. The computer has a stored series of 36 images of the button front design rotated about 10° increments. It compares the image sent by the camera at the first station with the images in its memory, and thereby determines the approximate position (within 5°) of the front part in the nest. The computer also detects the presence of front parts that do not have the same design as others in the supply. The mechanism at the second station is then directed to rotate the back part appropriately before placing it in the front part. Back parts are fed to their pick and place mechanism in a constant alignment to establish a reference from which rotation is begun.

The third work station crimps the circumference of the button to initially join the parts and secure their orientation. Incorporated in this device is a mechanism for detecting improper button combinations.

The fourth station removes improper button combinations, as determined by the detection device of the third station, through the use of a vacuum device.

The fifth station joins the button parts by a press to form a finished button assembly.

The sixth station removes the completed button assemblies to a container for shipment.

BRIEF DESCRIPTION OF THE DRAWINGS

These and other preferred features of the invention are shown in the attached drawing figures, wherein.

DETAILED DESCRIPTION OF THE PREFERRED EMBODIMENTS

Figure 1:
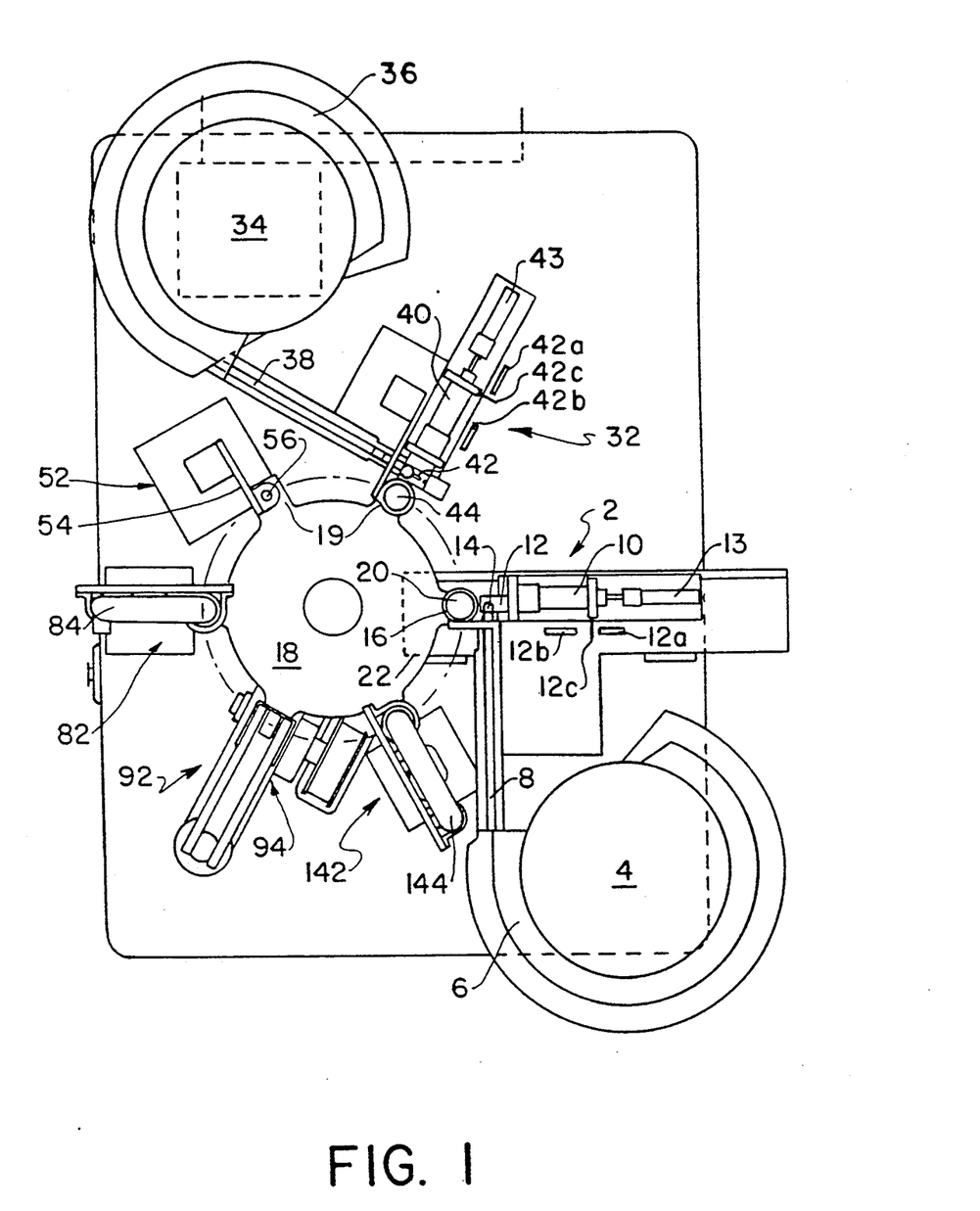
FIG. 1 is a plan view of the machine of the present invention as seen from above.
Figure 2:
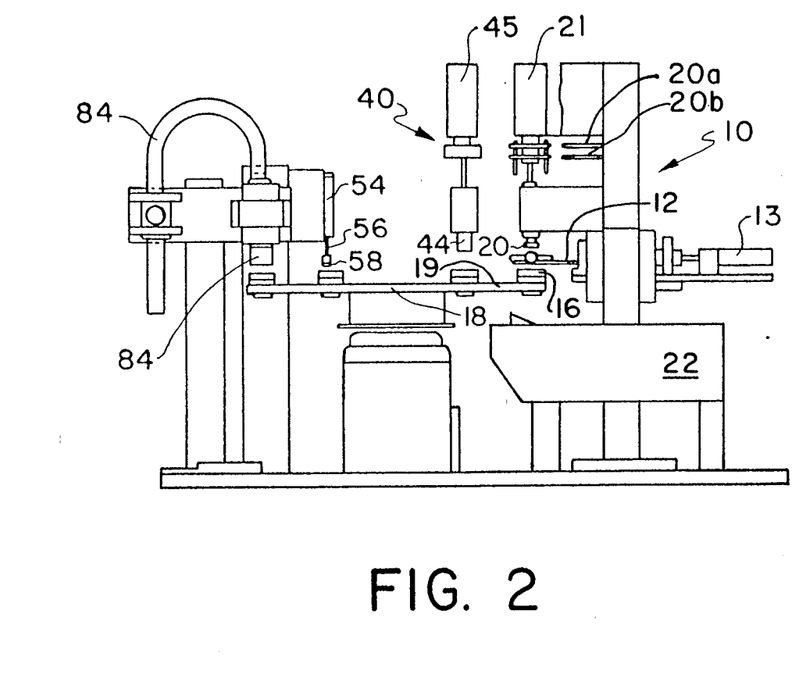
FIG. 2 is a side plan view of the machine of FIG. 1, showing the first through fourth button assembly stations.
Figure 3:
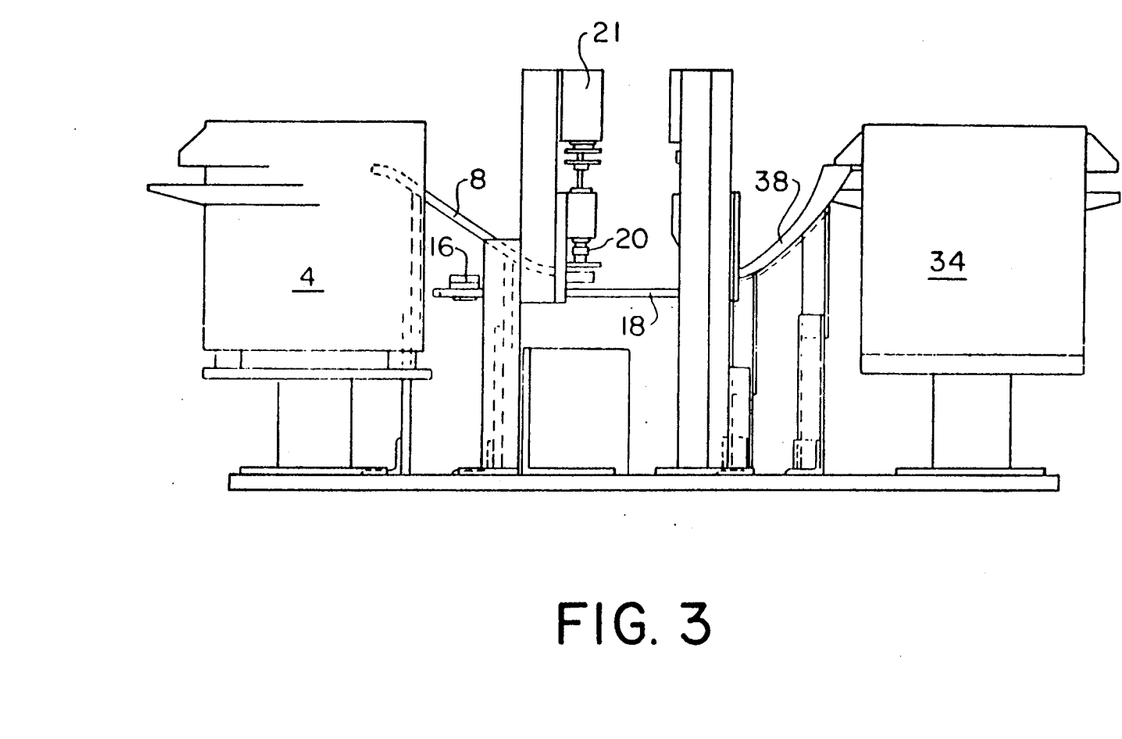
FIG. 3 is another side view of the machine of FIG. 1, showing the first and second stations and their associated vibrating bowls and tracks for supplying button parts.

According to the present invention as shown in FIGS. 1-3, at a first work station 2, button front shells are fed into a vibrating bowl 4 having a helical interior track 6 which orients the shells all in the same direction for subsequent forwarding to the assembly turntable. The vibrating bowl may be any of a number of commonly known and available devices, such as those made by Parts Feeder, Inc., East Hartford, Connecticut.

The shells leaving the vibrating bowl are positioned face down, with the open rear portion of the shell facing upwardly. These shells slide down a slotted track 8 to a pick and place mechanism 10. At the pick and place mechanism, a tray 12 receives a shell lying front down into a nest 14 in the tray. Tray 12 then moves horizontally under the action of air cylinder 13 toward the turntable until the shell is over the location at which nests 16 on a turntable 18 successively stop to receive shells. As shown in FIG. 2, a vertically-moving suction-operated finger 20 engages the open rear portion of the shell, lifting it upwardly to clear tray 12, which then withdraws to accept the next shell. Finger 20 lowers the shell to nest 16 and releases it, whereby gravitational force causes the shell to drop neatly into the nest.

The vertical movement of finger 20 is preferably controlled by an air cylinder 21. Any suitable robotic means for grasping and releasing may be used. According to a preferred embodiment of the present invention, vacuum suction is used to pick up and hold the shell. The suction is cut off when the shell is to be released.

Referring again to FIG. 1, the turntable 18 is a circular disk having six nubs 19 located at 60 degree intervals about the circumference of the turntable, and protruding beyond the circumference. Nests 16 are located on nubs 19.

Before each nest is rotated into position below finger 20, a video camera 22 positioned below the turntable and finger, as shown in FIGS. 1 and 2, takes a picture of the shell as it is held by the finger mechanism. Nubs 16 block the camera's line of sight when they arrive at the pick and place mechanism, but because they protrude from the turntable a clear view is available between the departure of one nub and the arrival of the next. Pick and place mechanism 10 is therefore coordinated with turntable 18 so that finger 20 holds a shell in line with camera 22 before a nub arrives.

The picture thus obtained is displayed on a conventional video terminal which is located in a computer control panel. The computer programming includes a data base of 36 images of the particular shell design, representing the shell oriented at 10° rotational increments. The computer program compares the image taken of the actual shell in position on the finger mechanism and compares it to the 36 images in its memory to determine the approximate orientation of the shell design (within 5 degrees).

The preferred video/computer controller for use with the present invention is the Itran MVP-2000 Machine Vision Processor, made by Itran Corp. of Manchester, New Hampshire. The Itran unit performs the comparison of stored images with the images supplied by camera 22, and provides the necessary information to carry out the step of properly orienting a button back before placing it with a shell.

Associated with the vision processor is a Macintosh computer that acts as an interface between a human operator and the vision processor. This interface is necessary because, according to the preferred mode of operating the invention, each different button design requires the performance of an initialization procedure to enter its image into the memory of the vision processor. It is possible to avoid this procedure, by providing a memory base containing different sets of button design images for each type of button to be joined by the machine. The computer capacity required for that setup is believed to be economically unjustified for a finite number of different button types, and because the Macintosh computer has been found suitable for performing this task in an acceptable time frame.

Thus, the interface provided by the Macintosh is a basic program that instructs the human operator on the steps to be carried out, and transmits the data obtained to the vision processor. To run the start-up program, the turntable is placed halfway between two index positions (this position is confirmed by ferrous metal sensor 166, see FIG. 16), in order to expose camera 22 to pick and place finger 20. Finger 20 is fed a button shell of the desired design, and an image of that shell design is sent to the vision processor. The processor artificially rotates the image in its memory in successive 10° increments, until a database of 36 images is obtained. The start-up procedure takes about fifteen minutes to execute.

A third computer control unit is also employed in the present invention. A microprocessor controller is used to coordinate and execute the various operations being simultaneously performed. Suitable controller components are made by Baldor/Delta Tau, Inc. of Canoga Park, California. The use of microprocessors in this manner is well known and is within the ability of a person skilled in the art.

After a shell has been imaged and loaded into a nest at the first station, the shell is then advanced to a second work station 32. This work station includes another vibrating bowl assembly 34, which provides button backs to another pick and place mechanism 40. The button backs are identically aligned as they are fed to pick and place mechanism 34, and this common alignment is maintained by entry of the backs into slotted track 38. Pick and place mechanism 40 consequently receives every back at the same position.

Pick and place mechanism 40 is identical in many respects to mechanism 10 at the first station. Tray 42 receives button backs with loops up, and transports them horizontally under the action of air cylinder 43 toward the turntable until they are directly over the position where the nests 16 are successively stationed. The backs are then picked up with suction by finger 44, as FIG. 2 illustrates, and tray 42 retracts. The vertical movement of finger 44 is controlled by air cylinder 45.

Figures 4, 12:
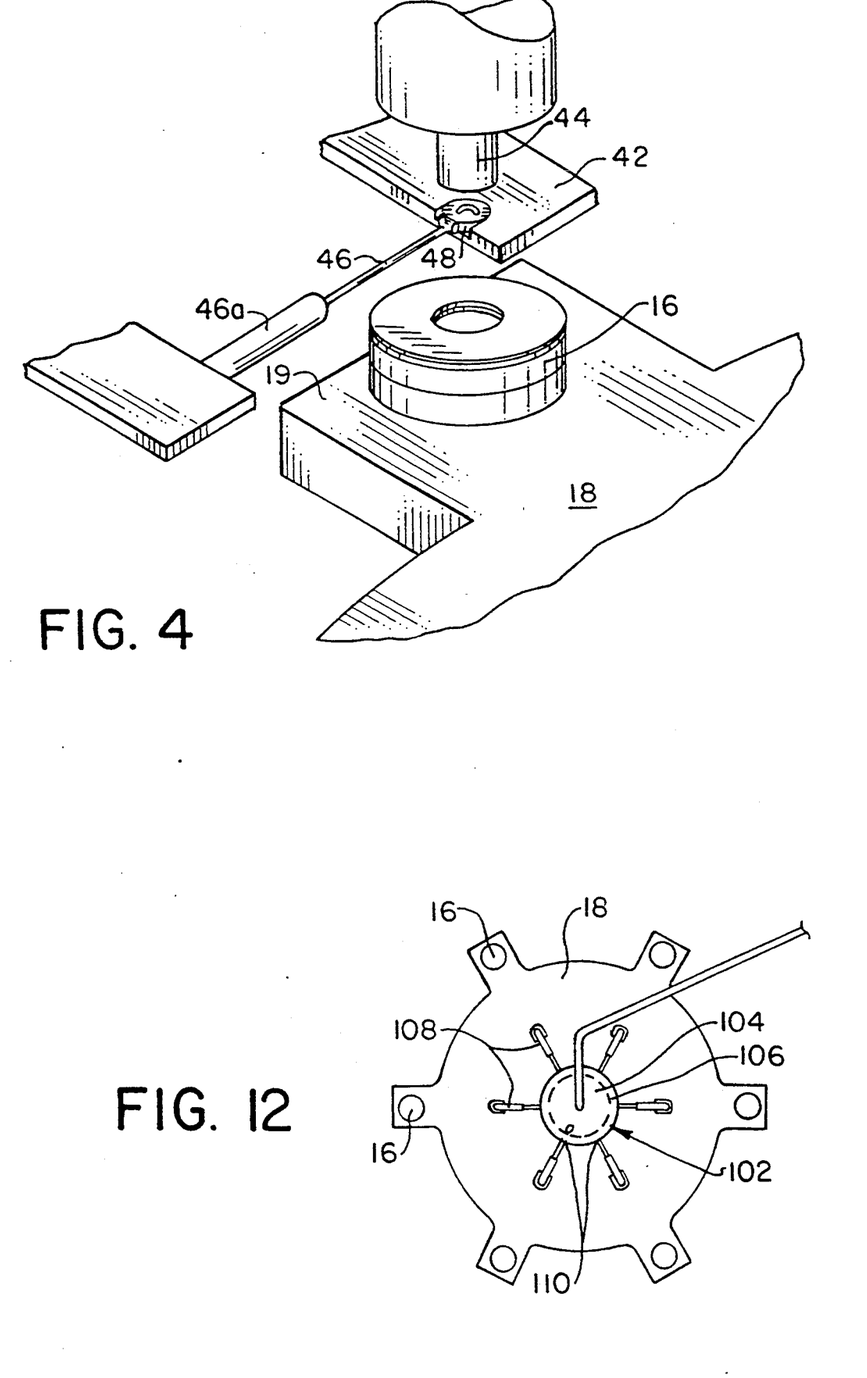
FIG. 4 is a close-up view of the pick and place mechanism of the second station.
FIG. 12 is a plan view of the turntable of the present invention; equipped with a rotary valve.

According to a preferred embodiment of the present invention, button backs within tray 42 are stabilized while finger 44 picks them up. Thus, FIG. 4 shows that a brace 46 extends to block the opening 48 in tray 42 where button backs enter the tray, when tray 42 extends to supply a back to finger 44. Brace 46 is moved by air cylinder 46a, mounted on support 46b.

The next step is to place the button back into the button shell so that the desired orientation between the two parts is achieved. In addition to vertical movement, finger 44 is capable of rotational movement. Due to the camera imagery, the computer has determined the approximate (±5°) orientation of the button shell within the nest, and this information is used to provide information for rotating the finger by an approximate number of degrees before placing the back into the shell to achieve the proper relative orientation of the back to the shell design. Due to the configuration of the button back (which is symmetrical about a 180° axis), the rotation mechanism only needs to rotate the back by a maximum of plus or minus 90 degrees to achieve the proper rotational position. The work at this station is completed when the button back at the proper rotational position is placed into the shell in the nest.

The movements of trays 12, 42 and fingers 20, 44 are monitored and controlled by ferrous metal sensors, also known as proximity switches. Two of these sensors are used in connection with each tray and each finger. One sensor detects when its tray or finger is fully retracted, and the other detects full extension.

FIG. 1 shows the sensors associated with trays 12, 42. Sensors 12a, 42a detect the retracted position of trays 12, 42 based on the proximity of trigger arm 12c, 42c. The extended tray position is similarly detected by sensors 12b, 42b.

FIG. 2 shows the sensors associated with finger 20 on pick and place mechanism 10. Sensor 20a detects the raised position of finger 20 in which a button shell has been lifted from the tray. Sensor 20b detects the lowermost extended position of finger 20, in which the shell is placed in a nest on the turntable. A similar arrangement is used to monitor the position of finger 44 at pick and place mechanism 40, but is not shown in FIG. 2.

Satisfactory sensors for use in the present invention include the model BI2-G12-AP6X, made by Turck Multiprox, Inc., Minneapolis, Minnesota.

The aforementioned microprocessor uses impulses from the sensors to coordinate and time the functions being performed. Thus, a signal that the tray is fully extended is used to determine that a button part is to be picked up from the tray. Upon a signal that the finger (carrying the button part) has retracted, the tray then retracts. A signal that the tray has retracted prompts a command for the finger to extend, place, and release the button part. The tray will extend with another button part once the finger sensor indicates full retraction. If the sequence of signals corresponding to this process is not maintained, as determined by the improper position of any components in the various work stations by the proximity sensor, production will automatically be stopped to prevent damage to the machine.

The button assembly then proceeds to a third station 52, shown in FIGS. 1 and 2, where a crimping mechanism 54 fixes the back to the shell by providing three crimp points along the circumference of the button. This prevents the button from losing alignment as it proceeds through the final stations of the machine. The crimper also stretches the edge material of the button parts, which eases the final forming of the buttons and improves the appearance of the final product, because the final forming press is given more material with which to work.

Figure 5:
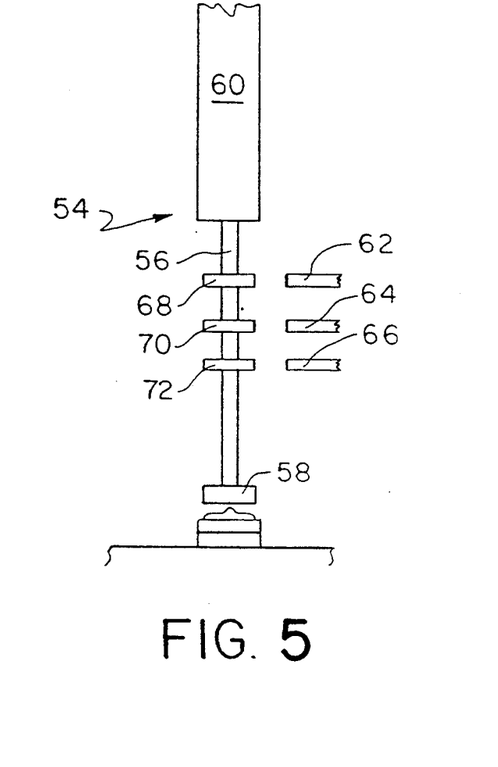
FIG. 5 is a close-up view of the crimper and detection device of the third station.

As shown in FIG. 5, crimper 54 operates by a vertically moving shaft 56, having a lower end 58 which crimps the button parts when shaft 56 is forced downwardly. Movement of shaft 56 is preferably produced by an air cylinder 60.

The crimper assembly includes sensors for detecting when incomplete button assemblies are crimped. In such cases, the button parts are to be rejected before final pressing. To identify the presence of incomplete buttons, a series of three sensors 62, 64, 66 is provided, corresponding to three metal discs 68, 70, 72 mounted coaxially on shaft 56. The top sensor 62 corresponds to top disc 68, and is responsible for monitoring when the shaft 56 reaches its retracted position. Bottom sensor 66, corresponding to disc 72, detects when a single button part is missing, based on the extra downward movement of the shaft 56 which will occur. Middle sensor 64, corresponding to middle disc 70, will detect when no button parts are present. "Mechanical" rejects are those determined by crimper 54 to be incomplete.

After crimping is completed and information about rejects gathered, the button assembly proceeds to the fourth station 82. Vacuum line 84, shown in FIGS. 1 and 2, will be engaged when sensors 62, 64, 66 determine that a mechanical defect has been generated, to remove any such defective buttons.

"Visual" rejects occur when camera 22 at the first station sends an image that the computer is unable to match to any in its memory. This occurs if no shell or a shell with an improper design is loaded, and the defect is removed by the vacuum line 84 when instructed to do so by the microprocessor. Otherwise, vacuum line 84 remains inactive.

Vacuum line 84 is commanded by the computer in any of these instances to apply suction when the right nest (i.e., the one containing the defect) arrives. An exception is that when it is determined that a nest is completely empty, i.e., that no button parts are present, then vacuum 84 will not operate, in order to conserve energy and equipment.

Rejected buttons are removed from the turntable and placed in a waste bin. The waste items can then be returned to the manufacturer as scrap for rework.

Figure 6:
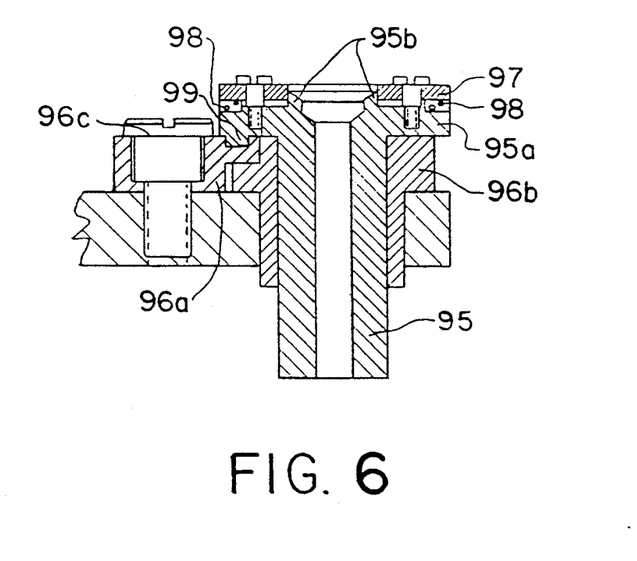
FIG. 6 is a cross-sectional view of a button holding nest suitable for use with the turntable of the present invention.

Referring again to FIG. 1, those buttons which are properly manufactured proceed past station four to be finally formed at a fifth station 92 by a press 94. In order to understand the operation of press 94, further detail regarding the construction of nests 16 may be helpful. As shown in FIG. 6, nests 16 comprise a shaft 95, collar 95a, stripper disc 97, and wave spring 98. The nests also have an annular rim 95b which fits concentrically within a hole in stripper 97. Rim 95b defines the portion in which a button assembly is held. Stripper 97 also acts to keep a button in place, and for this purpose normally extends above rim 95b. Wave spring 98 urges stripper 97 away from the collar 95a in order to maintain that higher normal position.

It is desirable, however, to provide for greater exposure of the button during crimping and pressing steps. Accordingly, stripper 97 can be retracted by pushing against spring 98 until the stripper meets collar 95a. At that point, the button will be surrounded only by the lower rim 95b and will be more exposed for crimping or pressing As FIG. 6 shows, nest 16 sits with its collar 95a resting on supports 96a, 96b. Preferably, collar 95a includes a key 99 disposed into a slot in support section 96a, which is held static by screw 96c. This prevents the shaft and collar portion of nest 16 from rotating, which could otherwise occur when turntable 18 is rotated from station to station.

The keyed design of nest 16 is especially important to the movement between the first and second stations, where rotation of the nest would cause deviation of the button shell loaded at the first station from its original, recorded orientation. Such deviation would result in a less accurate alignment between the button back and button shell, because the computer-guided placement of the button back would be based on inaccurate data.

An alternative and preferred type of nest does not use a stripper and wave spring to provide extra stability to a button. Instead, a vacuum source applies suction to the nest to hold the button parts, and a low rim 95b is the only solid restraint needed. The greater portion of the button is exposed constantly in this embodiment, facilitating the crimping and pressing operations.

When the vacuum type nest is used, however, it is necessary to remove the suction at stations where the button or button parts might be removed. A rotary valve 102 for effecting this selective application of vacuum and atmospheric pressure is shown in FIGS. 7-11.

Figures 7, 8:
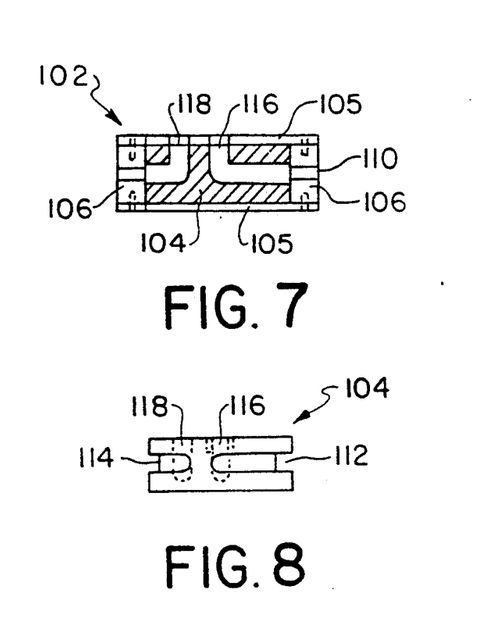
FIG. 7 is a cross-sectional view of the rotary valve of the present invention.
FIG. 8 is a side view of the rotor element of the rotary valve of FIG. 7.
Figure 9:
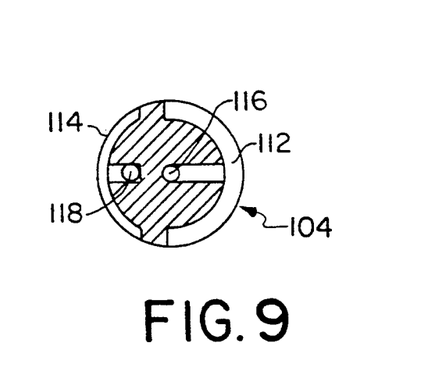
FIG. 9 is a top view of the rotor element of the rotary valve of FIG. 7.
Figure 10:
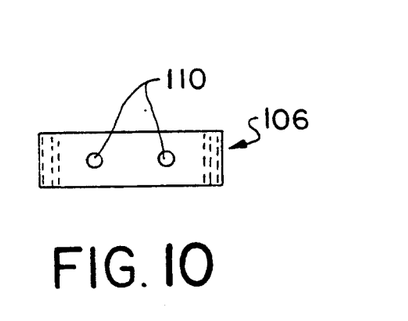
FIG. 10 is a side view of the distribution collar element of the rotary valve of FIG. 7.
Figure 11:
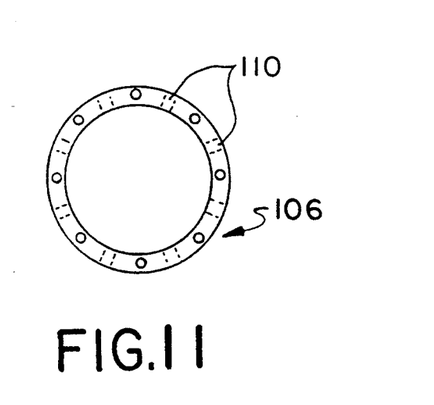
FIG. 11 is a top view of the distribution collar element of the rotary valve of FIG. 7.

Rotary valve 102 has two basic components: a central rotor 104, shown in FIGS. 8 and 9, and an annular distribution collar 106, shown in FIGS. 10 and 11. Rotor 104 fits within collar 106, and the two are held between plates 105, shown in FIG. 7. As shown in FIG. 12, valve 102 is mounted in the center of turntable 18, coaxially therewith. Nests 16 are connected by hoses 108 to openings 110 in collar 106, which is fastened to turntable 18 so that nests 16, collar 106 and hoses 108 rotate together on the turntable.

Rotor 104, on the other hand, is fastened to a stationary object off the turntable; rotor 104 does not rotate, in order that collar 106 can rotate around it.

Referring to FIGS. 7-9, rotor 104 has two channels 112, 114 around its circumference which communicate with openings 110 in collar 106 around the rotor. Channels 112, 114 separately lead to two openings 116, 118, respectively, in the top of rotor 104. A source of vacuum is connected to one of these openings, and the other is left exposed to atmospheric pressure (although each opening could be connected to positive or negative pressure as desired).

As the collar 106 rotates around rotor 104, openings 110, shown in FIGS. 7, 10 and 11, are alternately put in communication with channel 112 and then channel 114. By selecting a rotor 104 with channels 112, 114 in a particular arrangement, and by aligning those channels with the stations around the outside of the turntable, vacuum or atmospheric pressure is selectively applied to the nests at those stations.

The parts of rotary valve 102 are all ground to the proper minimum clearance necessary to assure smooth and reliable operation. No gaskets are necessary, because when properly ground and fitted, the parts combine in a substantially leak-proof fit.

Figure 13:
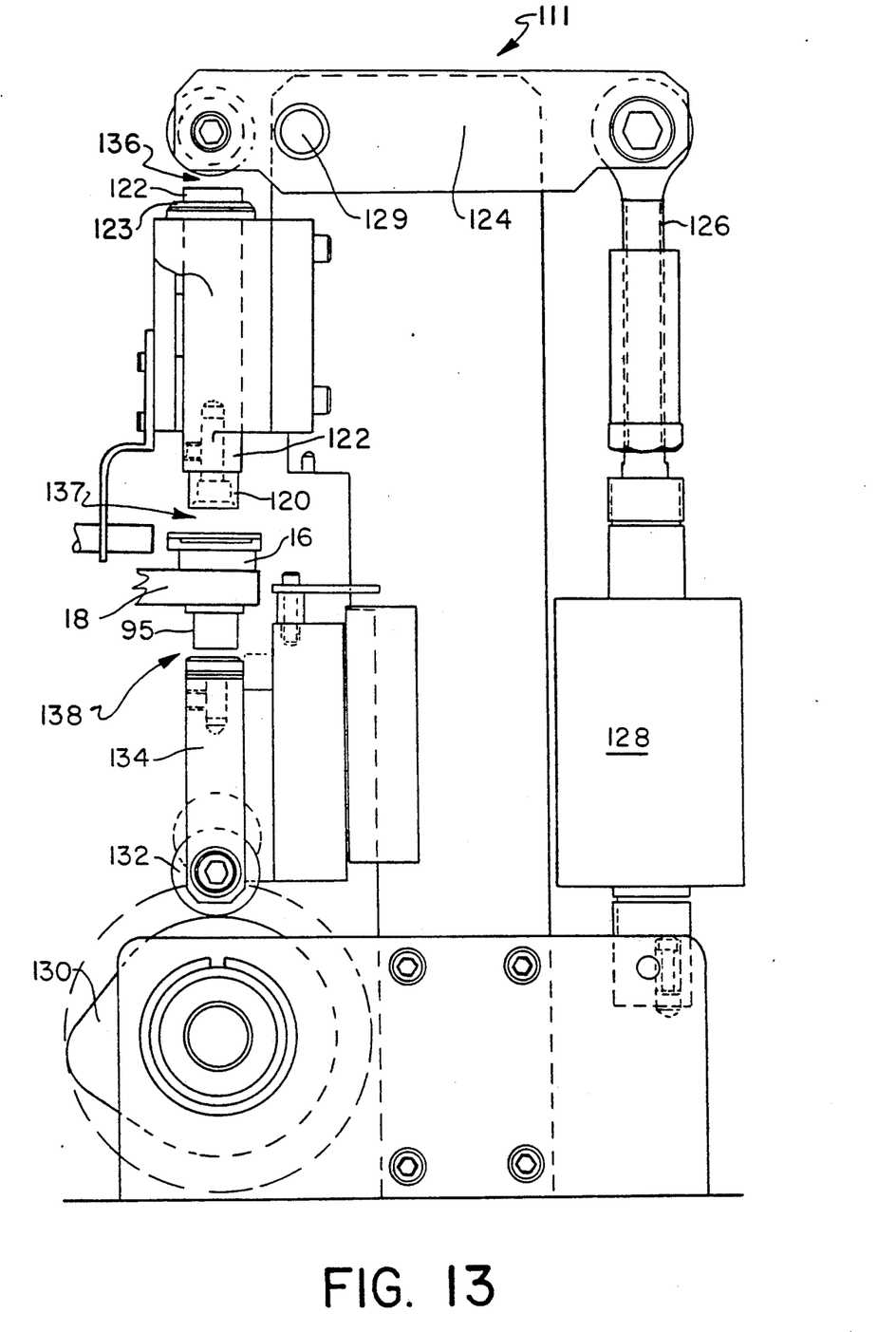
FIG. 13 is a plan view of the press mechanism used at the fifth station of the present invention.
Figure 14:
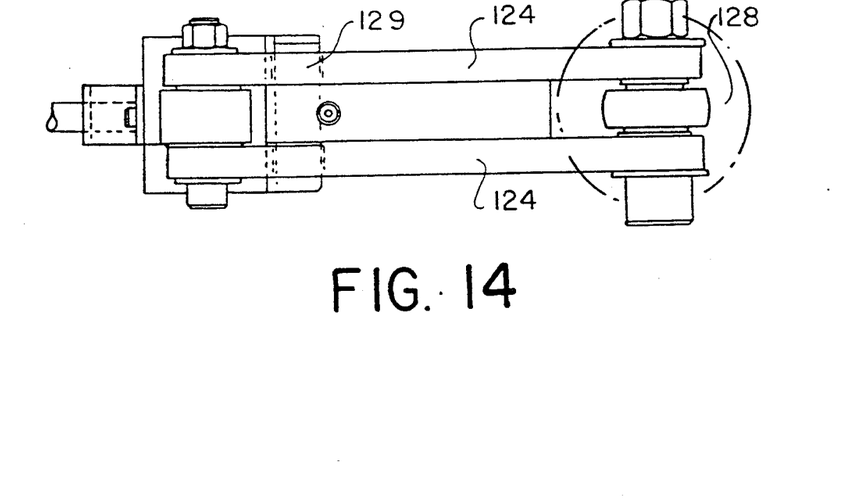
FIG. 14 is a top view of the linkage arms of the press mechanism of FIG. 13.
Figure 15:
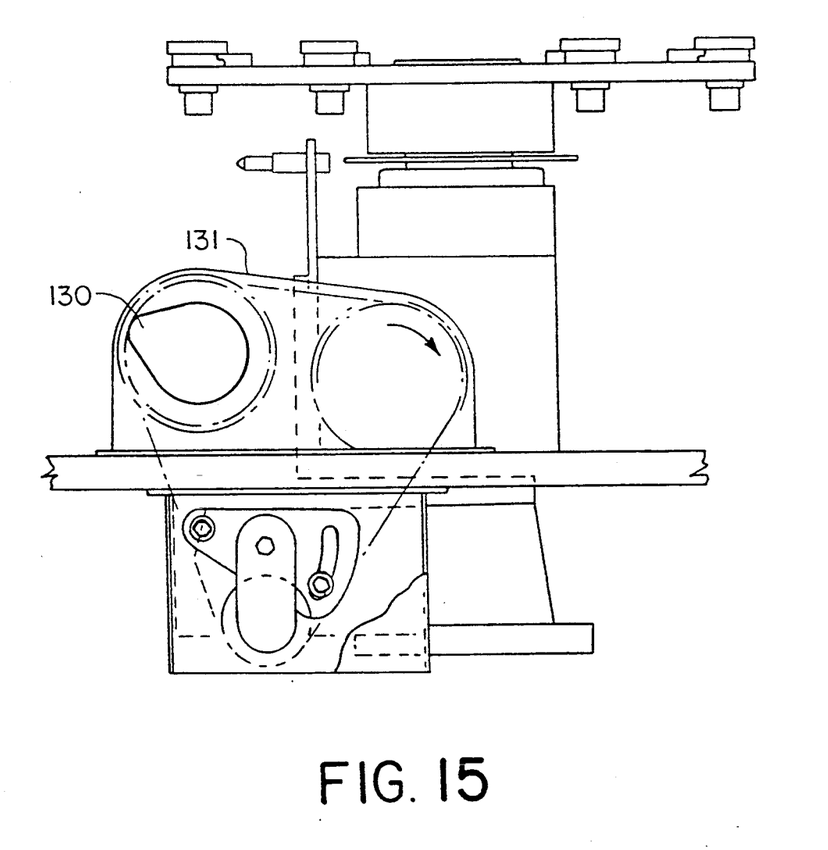
FIG. 15 is a side plan view of the drive mechanism for the press mechanism of FIG. 13.

The functioning of press 94 at the fifth station 92 will now be described with reference to FIGS. 13-15. Essentially, press 94 operates by pushing nests 16 upwardly from turntable 18 and into a waiting forming element 120. As described earlier, nests 16 comprise shafts 95. These shafts extend through openings in nubs 19 of turntable 18, and hang down below the turntable. Nest shafts 95, and therefore nests 16, may be forced upwardly for some distance without being disengaged from turntable 18.

To force nests 16 upwardly, a cam 130 is provided, on which cam follower 132 rides. Cam 130 is rotated by pulley 131 driven by motor 133, as shown in FIG. 15. The pulley, in turn, is driven by the motor of the indexing apparatus, which can be any suitable commercial device, as further explained below. Such an indexing apparatus commonly employs a motor that imparts constant rotary motion to a main indexer shaft. The intermittent indexing motion of the turntable is the result of a cam configuration on the main shaft (the turntable is typically indexed one station for every 360° rotation of the main shaft).

Pulley 131 is driven by this main shaft of the indexer, and cam 130 causes operation of press 94 intermittently in the same way that the indexer effects intermittent rotation of turntable 18. Timing the two events so that press 94 operates in between the rotational movements of the turntable is a matter of adjusting the orientation of cam 130 to be properly interrelated with the rotational position of the shaft and the orientation of the indexing cam to the shaft, as is known by those persons skilled in the art. One pressing step is to be performed for each nest, which requires one pressing step per indexing step.

Referring back to FIG. 13, cam follower 132 is a wheel mounted on lifting shaft 134. Lifting shaft 134 impacts the end of nest shaft 95 when shaft 134 is moved by cam 130. Nest 16 is thereby forced upwardly, and forming element 120 presses the button in the nest.

Lifting shaft 134 then falls back to its original position as cam follower 132 continues to follow the shape of the rotating cam 130. Nest 16 correspondingly falls back to the turntable surface. The turntable will not rotate again until nest 16 has fallen back, in order to prevent the nest from colliding with objects above the surface of the turntable. This is provided for by proximity switch 127, which senses the presence of nest 16 when nest 16 is seated on the surface of turntable 18.

The scale of movement required to form the buttons at press 94 is not great. For example, the clearances and forces can be arranged so that nests 16 are moved upwardly about 0.5" to contact forming element 120, and forming element 120 absorbs the impact by recoiling approximately 0.125", as further described below.

Forming element 120 is mounted on the end of a linkage 111 comprising three arm segments 122, 124, 126. Forming element 120 is mounted on the lower end of pressing shaft 122. Air cylinder shaft 126 is part of an air cylinder 128, which provides a shock absorbing, resilient resistance to the action of the press forcing a button and nest against forming element 120. A linkage arm may also be used for connecting air cylinder shaft 126 to pivot arm 124, if space considerations so warrant.

Pivot arm 124 operatively associates segments 122 and 126. Pivot arm 124 also acts as a lever pivoted at pivot point 129, located one fourth of the distance from the end engageable with pressing shaft 122 to the end connected to air cylinder shaft 126. This gives the shock absorbing cylinder 128 a 3:1 force advantage over the action of the press, which allows a lighter duty cylinder to be employed. Specifically, about 1200 lbs. pressure is used to close the buttons. Cylinder 128 needs to be only 400 lbs. in capacity, however, due to the position and arrangement of linkage 111.

The various moving parts of the press need not, and indeed cannot, be actually connected together. It is preferable for several clearance gaps to be left between the parts. Thus, a clearance gap 136 is provided between the upper end of the pressing shaft and the pivot arm. Gap 137 is provided between forming element 120 and the top of nests 16. Gap 138 is provided between the upper end of lifting shaft 134 and nest shafts 95. Gaps 137 and 138 are necessary when a turntable is used to rotate successive nests into position above lifting shaft 134 and below pressing shaft 120.

Because gaps are provided on both sides of nests 16 and pressing shaft 122, means for supporting those elements are needed when they are not being forced upwardly by engagement of lifting shaft 134 with nest shafts 95. Nests 16 are supported on the surface of turntable 18 by their collar portions, which are wider than the holes in turntable 18 through which nest shafts 95 extend. Pressing shaft 122 is supported by providing it with a collar 123, which establishes a lowermost normal position in which the shaft will be suspended under the force of gravity, when not engaged by nest 16.

Once the pressing step has been carried out, the completed button assembly then moves to a sixth work station 142, shown in FIG. 1, where all properly assembled buttons are removed by vacuum line 144 into a container for shipment. As mentioned previously, vacuum line 144 will operate intermittently (i.e., only when a button is present) to conserve energy and equipment.

Rotation of turntable 18 in the intermittent, sequential manner required by the present invention may be provided by any of a number of indexing apparatus commonly available and known to a person of ordinary skill in the art. One such device suitable for use with the present invention is the Camco Indexer Model 400RA, manufactured by Emerson Power Train Corporation, Wheeling, Illinois.

Figure 16:
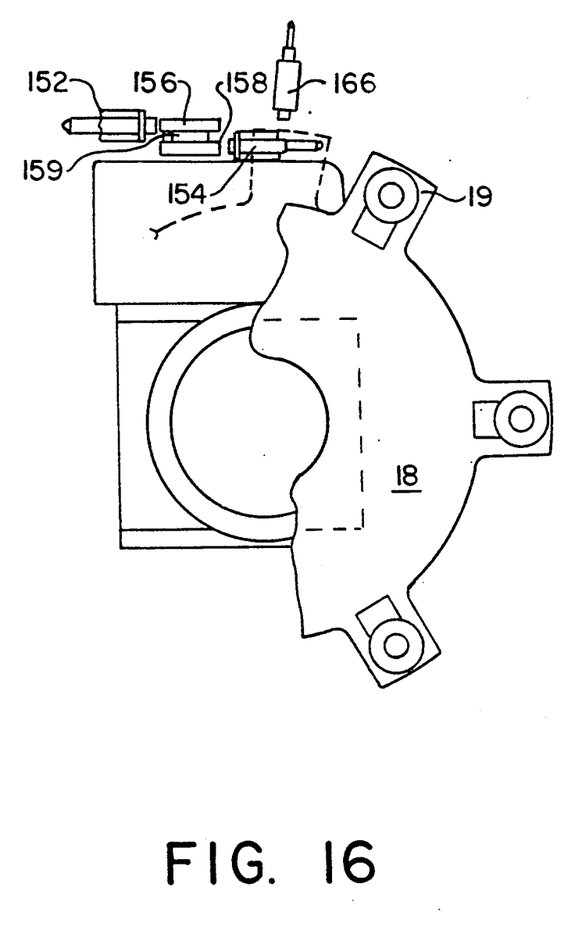
FIG. 16 is a cut-away view of the turntable of the present invention, showing sensors for monitoring the indexing position of the turntable.

The indexer is monitored as part of the assembly operation through numerous signals sent by proximity switches to the microprocessor throughout the assembly operation. Four switches monitor the actual rotational position of the turntable, and are shown in FIGS. 15 and 16.

A pair of switches 152, 154 detect when the turntable is being indexed and when it is not being indexed (i.e., in a "dwell" position). These switches respectively cooperate with cams 156, 158 mounted on the indexer shaft 159. The cams are shaped so that their surfaces periodically come close to the switches and then move away. The cams are oriented so that one of them triggers its respective proximity switch when the turntable is indexing, and the other cam triggers its switch when the turntable is in the dwell position.

Another switch is used to register disengagement of the indexer clutch, which occurs when the turntable's rotation is jammed. The indexer motor is shut off in response to that event. FIG. 15 shows that proximity switch 162 senses plate 164. When the indexer clutch disengages, plate 164 moves upwardly and triggers switch 162.

Finally, a fourth proximity switch 166 is employed to indicate when the turntable is in a half-indexed position (i.e., halfway between indexed positions). Switch 166 senses the side of any one of nubs 19 when the turntable is rotated in the vicinity of a half-indexed position. The turntable is placed in this position when the video controller is to be initialized, as explained earlier. It is necessary to move the turntable out of index for the initialization procedure, in order to give the camera 22 a clear view of a button shell held by pick and place mechanism 10.

We claim:

1. A method for orienting two button parts relative to each other, comprising:
    supplying a first button part in a fixed orientation;
    obtaining a video image of the first button part to ascertain its orientation;
    orienting a second button part with respect to the first button part based upon the video image of the first button part;
    placing the second button part in a desired orientation with respect to the first button part; and
    crimping said first and second button parts to secure said desired orientation.

2. The method of claim 1, wherein the first object is supplied at a first placement station, and the second object is placed at a second placement station, and which further comprises advancing the first object from the first placement station to the second placement station.

3. A method for producing buttons, comprising:
    retaining a first button part in a random fixed rotational orientation;
    comparing a video image of the first button part with a plurality of stored video images to determine the rotational orientation of the first button part;
    supplying a second button part at a predetermined orientation; and
    orienting and placing the second button part in a desired rotational orientation with respect to the first button part based on the orientation of the first button part to form a combination thereof.

4. The method of claim 3, which further comprises obtaining the first button part from a supply of such parts and placing the first button part upon a retaining means, and wherein the determining step is performed before the first button part placing step.

5. The method of claim 4, which further comprises moving the retaining means from a first button part placing means to a second button part placing means.

6. The method of claim 4, wherein the determining step comprises visually determining the orientation of the first button part, and comparing the visually determined orientation to a stored series of known orientations of the first button part.

7. The method of claim 3, wherein the second button part placing step includes rotating the second button part to the desired orientation.

8. The method of claim 7, wherein the retaining means is moved successively through a plurality of stations for performing button assembly steps.

9. The method of claim 3, which further comprises securing the orientation of the first and second button parts in the combination.

10. The method of claim 9, which further comprises crimping the first and second parts to fix their orientation before the securing step.

11. The method of claim 3, which further comprises detecting improper combinations of the first and second button parts.

12. A method for producing buttons comprising:
placing a first button part having an emblem thereon in a random rotational orientation upon a retaining means at a first placement station;
moving the first button part and retaining means to a second placement station;
orienting and placing a second button part adjacent the first button part in a desired rotational orientation based on the orientation of the emblem on the first button part to form a combination thereof at the second placement station;
moving the combination and retaining mans to a pressing station;
pressing the first and second button parts to form a finished button;
determining the presence of improper combinations of the first and second button parts before pressing;
removing the incomplete buttons from the retaining means before moving the retaining means to the pressing station; and
removing the finished button from the retaining means.

13. The method of claim 12, which further comprises moving the finished button and retaining means to a finished button removal station, wherein the button is removed from the retaining means at the finished button removal station.

14. The method of claim 13, which further comprises moving the combination and retaining means to a crimping station, before moving the combination and the retaining means to the pressing station, and crimping the button parts at the crimping station.

15. The method of claim 12, which further comprises moving the combination in the retaining means to an improper button combination removal station, after the determining step and before the finished button removing step, and removing improper button combinations at the improper button combination removal station.

16. The method of claim 15, wherein the orientation determining step comprises the steps of visually determining the orientation of the first button part, and comparing the visually determined orientation with a stored series of known orientations of the first button part to determine the orientation of the first button part.

17. The method of claim 12, which further comprises determining the orientation of the first button part before placing the second button part, and orienting the second button part based on the determined orientation of the first button part to obtain a desired orientation of the second button part with respect to the first button part.

18. A method for producing buttons, comprising:
feeding a supply of button front parts to a first station;
transporting a front part from the supply to a nest on a turntable;
visually determining the orientation of the front part during the front part transporting step;
comparing the visually determined orientation with a stored series of known orientations of the front part to determine the orientation of the front part and to identify front parts having improper designs;
placing the front part into the nest on the turntable;
rotating the turntable to move the nest to a second station;
feeding a supply of button back parts in a constant orientation to the second station;
transporting a back part from the supply to the nest and placing the back part adjacent the front part, forming a combination thereof;
orienting the back part during the back part transporting step according to the visually determined orientation of the front part to obtain a desired orientation of the back part with respect to the front parts;
rotating the turntable to move the nest to a third station;
crimping the back and front parts together to initially join them and fix their orientation;
determining the presence of incomplete button combinations during the crimping step;
rotating the turntable to move the nest to a fourth station;
removing incomplete combinations from the nest at the fourth station;
removing buttons having front parts with improper designs at the fourth station;
rotating the turntable to move the nest to a fifth station;
pressing the front and back parts to form a finished button;
rotating the turntable to move the nest to a sixth station; and
removing the finished button.

19. An apparatus for orienting two objects in a desired relationship in an assembly, comprising:
means for retaining a first object at a fixed rotational orientation;
means for selecting a first object having a random rotational orientation and placing the first object upon the retaining means in said orientation;
video means operatively associated with the selecting and placing means for comparing an image of the first object with a plurality of stored images to determine the fixed random rotational orientation of said first object;
means for supplying a second object at a predetermined orientation; and
means operatively associated with the first object orientation determining means for orienting and placing said second object in a desired rotational orientation with respect to the first object based on the determined random orientation of the first object to form a combination thereof.

20. The apparatus of claim 19 wherein the first object selecting and placing means comprises means for retrieving the first object from a supply of such objects and placing the first object upon the retaining means; wherein the fixed orientation of the first object is determined before placement upon the retaining means.

21. The apparatus of claim 20, further comprising means for moving said retaining means from said first object retrieving and placing means to said second object placing means.

22. The apparatus of claim 20 wherein the first object orientation determining means includes means for visually determining the orientation of the first object after retrieval from said supply; means for storing a series of known orientations of the first object; and means for automatically comparing the visually determined orientation to the stored series of known orientations to determine the fixed orientation of the first object.

23. The apparatus of claim 19 wherein the second object placing means includes means of automatically manipulating the second object to the desired orientation based on the fixed orientation of the first object.

24. The apparatus of claim 19 further comprising means for securing the orientations of the first and second objects in the combination to form the assembly.

25. The apparatus of claim 19 further comprising means for detecting improper combinations of the first and second objects.

26. An apparatus for orienting two button parts in a desired relationship in a button assembly comprising;
means for retaining a first button part having an emblem thereon at a fixed rotational orientation;
means for selecting a first button part having a random rotational orientation and placing he first button part upon the retaining means in said orientation;
video means operatively associated with the selecting and placing means for comparing an image of the emblem of the first button part with a plurality of stored images of such emblems to determine the fixed random rotational orientation of the emblem on the first button part;
means for supply a second button part at a predetermined orientation;
means operatively associated with the first button part orientation determining means for orienting and placing the second button part in a desired rotational orientation with respect to the first button part based on the orientation of the emblem on the first button part to form a button combination; and
means for joining said first and second parts to secure the desired orientation and form a button assembly.

27. An apparatus for orienting two button parts in a desired relationship in a button assembly comprising:
means for retaining a first button part at a fixed rotational orientation;
means for selecting a first button part having a random rotational orientation and placing the first button part upon the retaining means in said orientation;
means operatively associated with the selecting and placing means for determining the fixed random rotational orientation of the first button part, wherein said first button part is intended to have predetermined design and said determining means comprises means for detecting first button parts having designs other than said predetermined design;
means for supplying a second button part at a predetermined orientation;
means operatively associated with the first button part orientation determining means for orienting and placing the second button part in a desired rotational orientation with respect to the first button part based on the orientation of the first button part to form a button combination; and
means for joining said first and second parts to secure the desired orientation and form a button assembly.

28. The apparatus of claim 27, further comprising means for removing first button parts having designs other than said same design in response to said detecting means.

29. The apparatus of claim 27, further comprising means for crimping said first and second button parts to secure their desired orientation.

30. The apparatus of claim 29, wherein said crimping means further comprises means for determining the presence of an incomplete button combination.

31. The apparatus of claim 30, further comprising means for removing incomplete button combinations in response to said button combination determining means.

32. The apparatus of claim 31 wherein the retaining means includes a movable member having a plurality of nests for receiving said button parts; said movable member capable of sequentially directing each nest to a series of work stations for forming the button assembly.

33. An apparatus for producing button assemblies, comprising:
means for retaining at least one button part at a fixed rotational orientation; and
means for automatically advancing the retaining means sequentially through at least three work stations including:
a first button part placing station comprising means for selecting a first button part having a random rotational orientation and placing the first button part upon the retaining means in said orientation, said first button part having an emblem thereon;
a second button part placing stations comprising means for orienting and placing a second button part in a desired rotational orientation with respect to the first button part based on the random rotational orientation of the emblem on the first button part;
a joining station comprising means for joining the first and second button parts to secure the desired rotational orientation and form a finished button assembly; and
video means operatively associated with the selecting and placing means for comparing an image of the emblem of the first object with a plurality of stored emblem images to determine the fixed random rotational orientation of said first object.

34. The apparatus of claim 33, further comprising a finished button assembly removal station comprising means for removing the finished buttons.

35. The apparatus of claim 33, wherein the retaining means comprises a plurality of nests located on a turntable and further comprising means for selectively holding first button parts in said nest at predetermined work stations.

36. The apparatus of claim 35 wherein said holding means comprises a rotary valve comprising an annular collar secured coaxially to the turntable and having an inner surface and an outer surface and a plurality of passages extending from the inner surface to the outer surface, and a rotor fitted within said annular collar and secured to remain stationary with respect to the turntable, the rotor having a circumferential side portion and a first channel extending from at least one opening in the circumferential side portion to an opening connected to a first source of pressure, whereby the first channel is sequentially placed in communication with each of the plurality of passages when the turntable is rotated; and means for connecting the passages at the outer surface to the nests, so that the nests are in flow communication with the first pressure source when the first channel is placed in communication with a passage to which the nest is connected.

37. The apparatus of claim 36, wherein the first pressure source is a vacuum, and wherein the at least one opening in the circumferential side portion from which the first channel extends is radially aligned with the first button part placing station, the second button part placing station, and the joining station.

38. The apparatus of claim 37, wherein the rotor further comprises a second channel extending from at least one opening in the circumferential side portion to an opening at atmospheric pressure.

39. The apparatus of claim 38, wherein the at least one opening in the circumferential side portion from which the second channel extends is radially aligned with the finished button removal station.

40. The apparatus of claim 35 wherein the first button part placing means includes a first button part retrieval means for retrieving said first button part from a supply of same and for directing the retrieved first button part to the retaining means.

41. The apparatus of claim 35, further comprising a microprocessor for coordinating the button assembly operations as the nests are rotated by the turntable.

42. An apparatus for producing button assemblies, comprising:
  means for retaining at least one button part at a fixed rotational orientation;
  means for automatically advancing the retaining means sequentially through at least three work stations including:
    a first button part placing station comprising means for selecting a first button part having a random rotational orientation and placing the first button part upon the retaining means in said orientation, wherein the first button part placing means includes a first button part retrieval means for retrieving said first button part from a supply of the same and for directing the retrieved first button part to the retaining means;
    a second button part placing station comprising means for orienting and placing a second button part in a desired rotational orientation with respect to the first button part based on the random rotational orientation of the first button part; and
    a joining station comprising means for joining the first and second button part to secure the desired rotational orientation and form a finished button assembly;
  further comprising means for selectively holding said first button parts in said retaining means at predetermined work stations, and means for supplying first button parts to said retrieval means, wherein the retrieval means includes a tray member for sequentially retrieving first button parts from said supplying means and a finger member for removing the first button part from the tray and placing it upon the retaining means.

43. The apparatus of claim 42, further comprising means for determining the orientation of the first button part prior to placement in the retaining means, and wherein the second button part placing means includes means for automatically manipulating the second button part based on the fixed orientation of the first button part to obtain said desired orientation.

44. The apparatus of claim 43, wherein the first button orientation determining means includes a camera for visually determining the orientation of the first button part, operatively associated with computer means including means for storing a series of known orientations of the first button part and means for comparing the visually determined orientation of the first button part to the stored series of known orientations to determine the first button part orientation.

45. An apparatus for producing button assemblies, comprising:
  means for retaining at lest one button part at a fixed rotational orientation; and
  means for automatically advancing the retaining means sequentially through at least three work stations including;
    a first button part placing station comprising means for selecting a first button part having a random rotational orientation and placing the first button part in the retraining means in said orientation;
    a second button part placing station comprising means for orienting and placing a second button part in a desired rotational orientation with respect to the first button part based on the random rotational orientation of the first button part; and
    a joining station comprising means for joining the first and second button part to secure the desired rotational orientation and form a finished button assembly;
  wherein the retaining means comprises a plurality of nests located on a turntable and the joining means is a press comprising means for lifting the retaining means in an upward path, a pressing shaft and an air cylinder for resiliently resisting the upward movement of the retaining means by a distance which is less than the upward movement of the lifting means; and
  a pivot arm having a first end and a second end, and wherein the pressing shaft comprises a lower end for engaging the nest and an upper end for transmitting force to the first end of said pivot arm, and wherein the second end of the pivot arm transmits force to the air cylinder.

46. The apparatus of claim 45, further comprising means for indexing the turntable to sequentially place each of the nests in a pressing position above the lifting means and below the pressing shaft, wherein a single joining operation is performed for each nest placed in the pressing position.

47. The apparatus of claim 45, wherein the pressing shaft has an upper end and a lower end, and is independently suspended by a collar, and wherein the upper end of the pressing shaft is separated from the pivot arm by a first clearance gap, the lower end of the pressing shaft is separated from the nests by a second clearance gap, and the lifting means is separated from the nest by a third clearance gap.

48. The apparatus of claim 47, wherein the pivot arm is pivoted at a pivot point located closer to the first end of the pivot arm than the second end of the pivot arm, for imparting a force advantage to the air, cylinder.

49. The apparatus of claim 48, wherein the pivot point is located one fourth of the distance from the first end of the pivot arm to the second end of the pivot arm, for imparting a 3:1 force advantage to the air cylinder.

50. An apparatus for producing button assemblies, comprising:

means for retaining at least one button part at a fixed rotational orientation;

means for automatically advancing the retaining means sequentially through at least three work stations including:

a first button part placing station comprising means for selecting a first button part having a random rotational orientation and placing the first button part upon the retaining means in said orientation;

a second button part placing station comprising means for orienting and placing a second button part in a desired rotational orientation with respect to the first button part based on the random rotational orientation of the first button part; and a joining station comprising means for joining the first and second button part to secure the desired rotational orientation and form a finished button assembly, and further comprising means for selectively holding first button parts in said retaining means at predetermined work stations;

further comprising a crimping station comprising means for crimping together the first and second button parts, the crimping station located between the first button part placing station and the joining station along the path of the retaining means as it is advanced.

51. The apparatus of claim 50, wherein the crimping means comprises means for determining the presence of incomplete button assemblies.

52. The apparatus of claim 51, further comprising an incomplete button removal station comprising means for removing incomplete button assemblies.

* * * * *